US011140122B1

(12) United States Patent
Dudley et al.

(10) Patent No.: US 11,140,122 B1
(45) Date of Patent: Oct. 5, 2021

(54) CENTRALIZED LAYER 1 TO LAYER 2 MAPPING ENGINE

(71) Applicant: Charter Communications Operating, LLC, St. Louis, MO (US)

(72) Inventors: Thomas Dudley, Castle Rock, CO (US); Ognian Mitev, Aurora, CO (US)

(73) Assignee: Charter Communications Operating. LLC, St. Louis, MO (US)

( * ) Notice: Subject to any disclaimer, the term of this patent is extended or adjusted under 35 U.S.C. 154(b) by 0 days.

(21) Appl. No.: 17/152,197

(22) Filed: Jan. 19, 2021

(51) Int. Cl.
G06F 15/173 (2006.01)
H04L 29/12 (2006.01)
H04L 12/24 (2006.01)

(52) U.S. Cl.
CPC .......... *H04L 61/103* (2013.01); *H04L 41/024* (2013.01); *H04L 61/1541* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 8,447,884 | B1* | 5/2013 | Baumann | H04L 61/103 709/245 |
| 2009/0279551 | A1* | 11/2009 | Wong | H04L 41/0631 370/395.53 |
| 2012/0131157 | A1* | 5/2012 | Gospodarek | H04L 61/6022 709/222 |
| 2013/0272111 | A1* | 10/2013 | Yu | H04L 45/22 370/216 |
| 2018/0054357 | A1* | 2/2018 | Kaplan | H04L 41/0853 |
| 2018/0241653 | A1* | 8/2018 | Pelletier | H04L 43/0811 |
| 2020/0177674 | A1* | 6/2020 | Liu | H04L 67/1038 |
| 2020/0366523 | A1* | 11/2020 | Chen | G06F 21/606 |

OTHER PUBLICATIONS

IEEE, "IEEE Standard for Ethernet." IEEE Standard 802.3-2012, Revision of IEEE Std 802.3-2008 (Dec. 28, 2012): 1-634.
IEEE, "IIEEE Standard for Local and metropolitan area networks—Station and Media Access Control Connectivity Discovery" IEEE Standard 802.1AB-2016 (Mar. 11, 2016): 1-146.

* cited by examiner

*Primary Examiner* — Phyllis A Book
(74) *Attorney, Agent, or Firm* — Mendelsohn Dunleavy, P.C.; Steve Mendelsohn (57) ABSTRACT

In certain embodiments, a communication (comm) network has interconnected comm systems and a mapping engine, each comm system having one or more Layer 1 (L1) components physically connected to one or more Layer 2 (L2) components, wherein components are physically connected to L1 components of different comm systems. Logical connections between the L2 components of the different comm systems are determined using a link-layer discovery process (LLDP), and physical connections between the L1 and L2 components of each comm system are determined using LLDP snooping. The mapping engine queries the L2 components for LLDP results and the L1 components for LLDP snooping results and generates end-to-end mappings for circuits between the L2 components of the different comm systems, where the end-to-end mappings are represented in a circuit inventory database that can be accessed to avoid system outages when the network is modified.

8 Claims, 4 Drawing Sheets

CENTRALIZED LAYER 1 TO LAYER 2 MAPPING ENGINE

BACKGROUND

Field of the Disclosure

The present disclosure relates to distributed communication networks and, more specifically but not exclusively, to optical communication networks that transmit signals over optical fibers and the like.

Description of the Related Art

This section introduces aspects that may help facilitate a better understanding of the disclosure. Accordingly, the statements of this section are to be read in this light and are not to be understood as admissions about what is prior art or what is not prior art.

Figure 1:
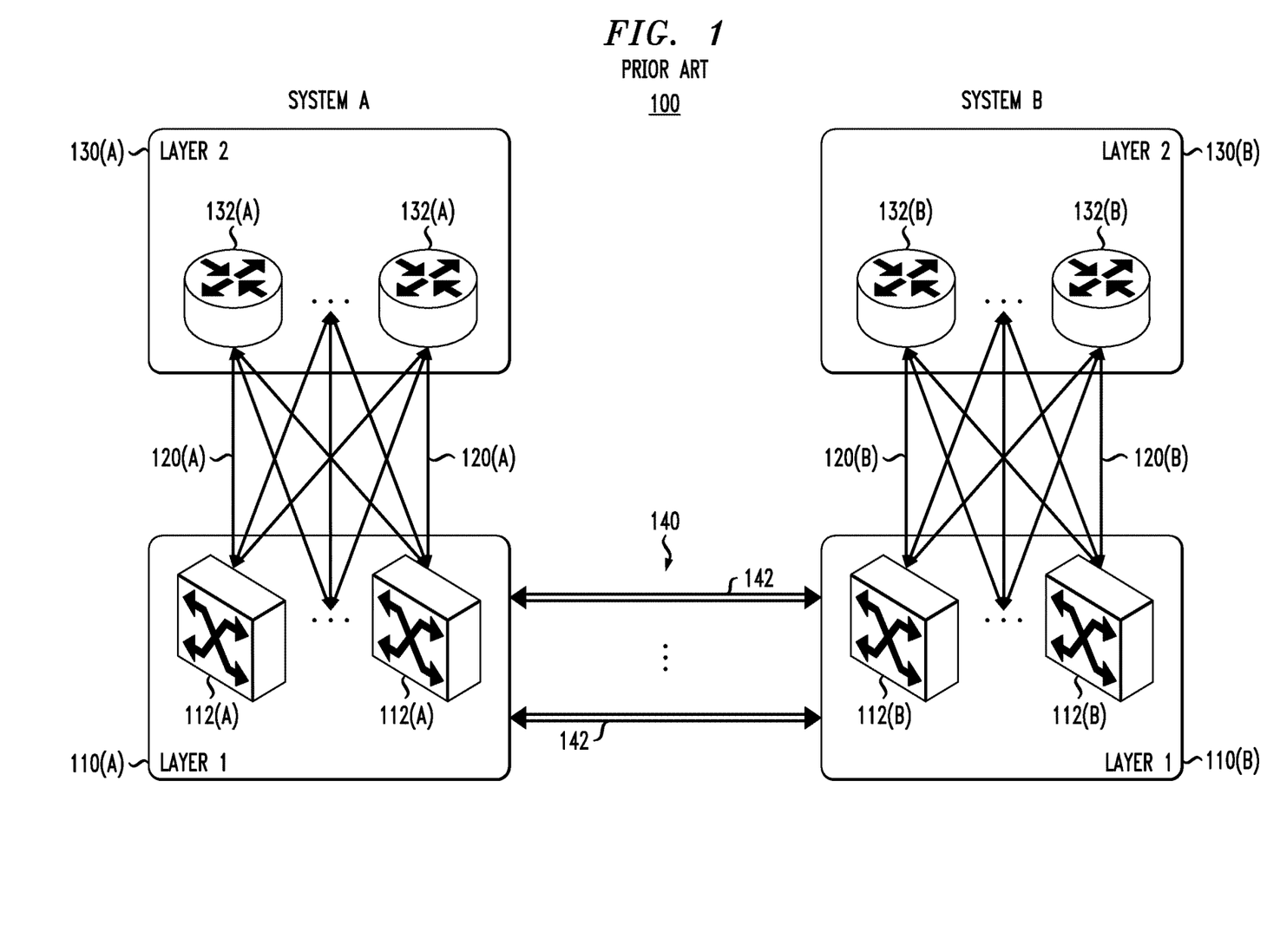
FIG. 1 is a block diagram of a portion of a conventional communication network.

FIG. 1 is a block diagram of a portion of a conventional optical communication network 100 comprising (at least) two different communication (comm) systems (System A and System B) located, for example, in two different cities, where Systems A and B exchange signals over an optical transport network 140 comprising one or more optical fibers 142. Those skilled in the art will understand that the comm network 100 may have one or more other comm systems located, for example, in different cities that exchange signals over one or more other optical transport networks.

As shown in FIG. 1, System A has (i) a Layer 1 (L1) subsystem 110(A) comprising one or more L1 components 112(A) and (ii) a Layer 2 (L2) subsystem 130(A) comprising one or more L2 components 132(A), where each L1 component 112(A) is interconnected by one or more optical or electrical connections 120(A) with one or more (but not necessarily all) L2 components 132(A), and vice versa. Those skilled in the art will understand that, depending on the particular implementation:

- The L1 components may include suitable components such as (without limitation) transponders, muxponders, amplifiers, wavelength-selective switch (WSS) reconfigurable optical drop-add multiplexers (ROADMs), and/or optical time-domain reflectometers (OTDRs);
- The L2 components may include suitable components such as (without limitation) routers, switches, bridges, DOCSIS cable devices, repeaters, and/or other suitable end points for circuits interconnecting Systems A and B;
- System A may include one or more additional, higher-layer (e.g., L3, L4, etc.) subsystems with additional suitable components such as (without limitation) routers, stations, telephones, and/or WLAN access points; and
- System B is analogous to System A with (i) an analogous L1 subsystem 110(B) having one or more analogous L1 components 112(B) and (ii) an analogous L2 subsystem 130(B) having one or more analogous L2 components 132(B) interconnected by one or more analogous optical or electrical connections 120(B).

As used herein, the term "circuit" refers to the end-to-end communication path from an L2 component in one system to and through the L1 component in that system to and through an optical fiber in the optical transport network to and through an L1 component in another system to an L2 component in that other system.

Each L2 component 132(A) in System A routes outgoing optical or electrical signals via one or more optical or electrical connections 120(A) to one or more System A L1 components 112(A), which multiplex or convert those optical or electrical signals into outgoing optical signals that get transmitted via one or more optical fibers 142 in optical transport network 140 to one or more L1 components 112(B) in System B. In addition, each L1 component 112(A) in System A receives incoming optical signals via one or more optical fibers 142 in optical transport network 140 from one or more L1 components 112(B) in System B and demultiplexes or converts those optical signals into incoming electrical signals that get transmitted via one or more optical or electrical connections 120(A) to one or more System A L2 components 132(A). System B operates in analogous ways to receive incoming optical signals from System A and transmit outgoing optical signals to System A.

Although not explicitly represented in FIG. 1:
- An optical or electrical connection 120(A) in System A interconnects a particular optical or electrical port of a particular L1 component 112(A) to a particular optical or electrical port of a particular L2 component 132(A);
- That optical or electrical port of that L2 component 132(A) is connected internally to a particular optical or electrical port of that L2 component 132(A);
- An optical fiber 142 in transport network 140 interconnects that optical port of that L1 component 112(A) in System A to a particular optical port of a particular L1 component 112(B) in System B;
- That optical port of that L1 component 112(B) is connected internally to a particular optical or electrical port of that L1 component 112(B); and
- An optical or electrical connection 120(B) in System B interconnects that optical or electrical port of that L1 component 112(B) to a particular optical or electrical port of a particular L2 component 132(B).

Traditionally, network operators have used spreadsheets or third-party applications to manually document the physical connectivity between L1 and L2 components within a comm system and the physical connectivity between the L1 components in different comm systems. This manual process is prone to human error during network capacity adds, upgrades, or changes, and the connectivity data can become corrupted over time where documentation is inaccurate. Such inaccuracies can lead to self-inflicted outages during network modifications where the actual connectivity does not align with the documented, expected connectivity.

SUMMARY

Problems in the prior art are addressed in accordance with the principles of the present disclosure by a centralized mapping engine that automatically and periodically queries the different communication systems of a communication network to determine—and maintain a circuit inventory database containing—the end-to-end mappings for each Layer 2 component of one comm system that is logically connected to a Layer 2 component of another comm system, where each mapping identifies the port-to-port connection between the L1 and L2 components within each of the two comm systems, the port-to-port connection within the L1 component of each comm system, and the port-to-port connection between L1 components of the two comm systems. The resulting circuit inventory database can then be accessed whenever modifications are made to the communication network to avoid outages and other disruptions to the operations of the network.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 2:
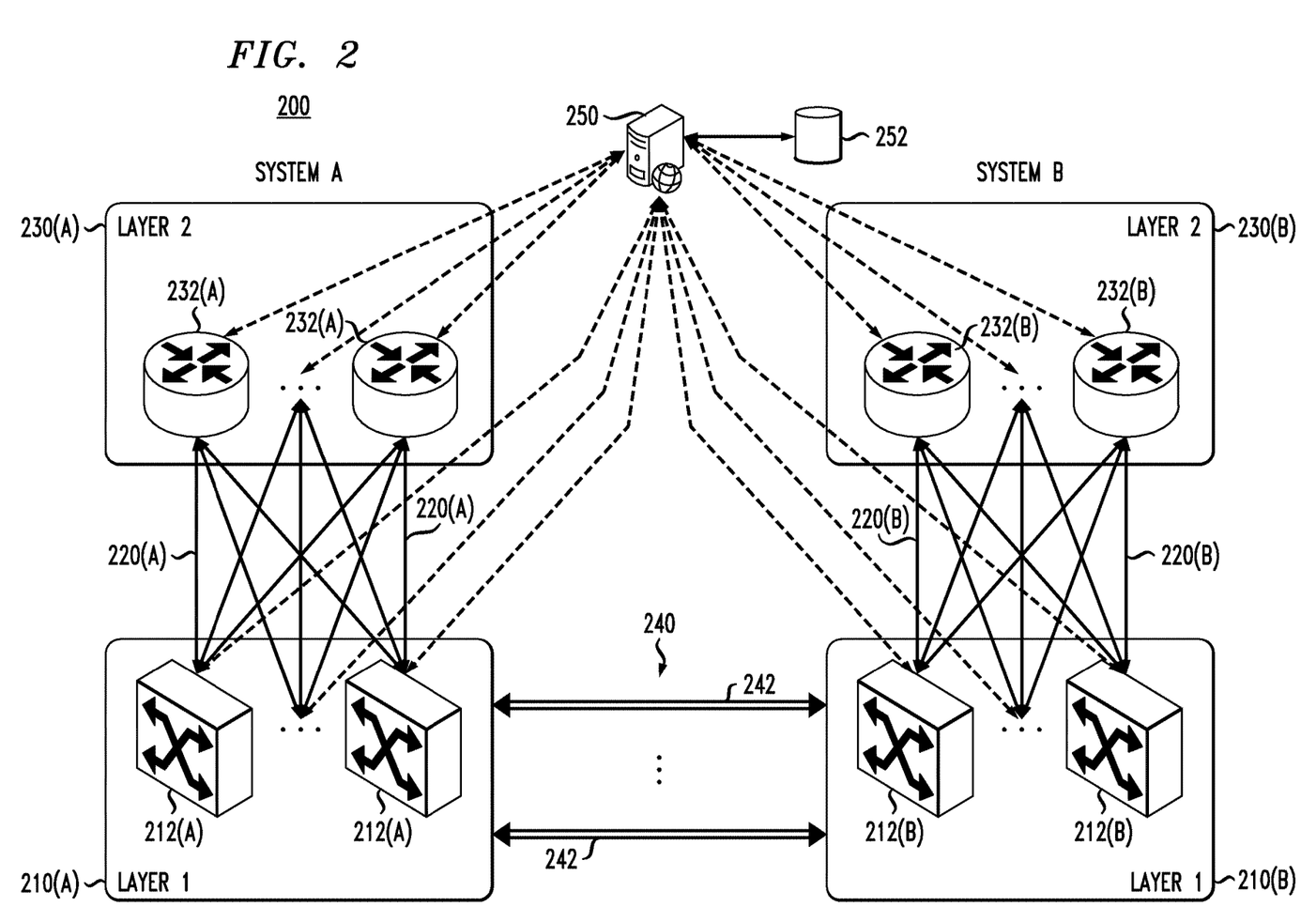
FIG. 2 is a block diagram of a portion of a communication network according to one embodiment of the disclosure.

FIG. 2 is a block diagram of a portion of a communication network 200 according to one embodiment of the disclosure. Like FIG. 1, FIG. 2 shows two comm systems (A and B), each having (i) an L1 subsystem 210 with one or more L1 components 212 and (ii) an L2 subsystem 230 with one or more L2 components 232 interconnected by one or more optical or electrical connections 220, where Systems A and B exchange signals via the one or more optical fibers 242 of optical transport network 240.

In one possible implementation of comm network 200, the L2 components 232(A) and 232(B) perform a link-layer discovery process (LLDP) in which the L2 components in different comm systems exchange special LLDP messages to identify which of their ports are logically interconnected. The LLDP protocol is formally referred to by the IEEE as Station and Media Access Control Connectivity Discovery, as specified in IEEE 802.1AB and IEEE 802.3-2012 section 6 clause 79, the teachings of which are incorporated herein by reference. See https://standards.ieee.org/standard/802_1AB-2016.html.

In addition, each L1 component 212(A) in System A performs LLDP snooping in which the L1 component 212(A) inspects incoming messages that are part of Ethernet frames passing through it to identify which incoming messages are LLDP messages and then analyzes those LLDP messages to identify which of its ports are connected to identified ports of the L2 components 232(A) in System A, and similarly for each L1 component 212(B) in System B. LLDP snooping is described as an L1 component on the client interface "snooping" on LLDP messages sent by one or more L2 components.

As shown in FIG. 2, comm network 200 also includes a centralized mapping engine 250 and a local memory 252. The memory 252 stores a device inventory database that identifies the L1 and L2 components currently provisioned in the comm network 200. Depending on the particular implementation, the device inventory database may be generated and then updated manually or automatically as devices are added to and removed from the comm network 200. Devices are manually or automatically added to the device inventory database via Command Line Interface (CLI), Simple Network Management Protocol (SNMP), Netconf, Application Programming Interface (API), and/or other protocols, as the devices are being provisioned. Queries can be made by network management systems and element management systems to the existing network to discover equipment already deployed.

The memory 252 also stores a circuit inventory database that identifies the end-to-end mappings for the circuits currently configured in comm network 200 from each L2 component 232(A) in System A to a corresponding L2 component 232(B) in System B.

In order to generate the end-to-end mappings in the circuit inventory database, the mapping engine 250 automatically and periodically queries the L1 and L2 components in Systems A and B for specific information. In particular, the mapping engine 250 automatically and periodically queries the L2 components 232(A) and 232(B) of Systems A and B for their LLDP results, which identify the logical port-to-port connections between pairs of those L2 components in different comm systems. The mapping engine 250 also automatically and periodically queries the L1 components 212(A) and 212(B) of Systems A and B for their LLDP snooping results, which identify the physical port-to-port connections between the L1 components 212(A) and the L2 components 232(A) in System A as well as the physical port-to-port connections between the L1 components 212(B) and the L2 components 232(B) in System B. In addition, the mapping engine 250 queries the L1 components 212(A) in System A for the internal port-to-port connections between their optical or electrical ports (each of which is connected to a specific optical or electrical connection 220(A)) and their optical ports (each of which is connected to a specific optical fiber 242 in the optical transport network 240), and likewise for the L1 components 212(B) in System B. Depending on the particular implementation, the mapping engine 250 can perform all of this querying using suitable messaging, such as (without limitation) Simple Network Management Protocol (SNMP), Command Line Interface (CLI), Netconf, and/or Application Programming Interface (API) calls.

The mapping engine 250 uses this collected information to generate the end-to-end circuit mappings that are also stored in the circuit inventory database in memory 252, where each end-to-end mapping identifies:

The specific optical or electrical port of an L2 component 232(A) in System A that is connected to a specific optical or electrical port of an L1 component 212(A) in System A;

The specific optical port of that L1 component 212(A) that is connected to that specific optical or electrical port of that L2 component 232(A);

The specific optical port of an L1 component 212(B) in System B that is connected to that specific optical port of that L1 component 212(A) in System A;

The specific optical or electrical port of that L1 component 212(B) that is connected to that specific optical port of that L1 component 212(B); and The specific optical or electrical port of an L2 component 232(B) in System B that is connected to that specific optical or electrical port of that L1 component 212(B) of System B.

The circuit inventory database stored in memory 252 is available for inspection by other processes to determine the end-to-end mappings currently provisioned in the comm network 200. This information can be accessed to avoid outages and other disruptions to the operations of the comm network 200 when network modifications are made.

Figure 3:
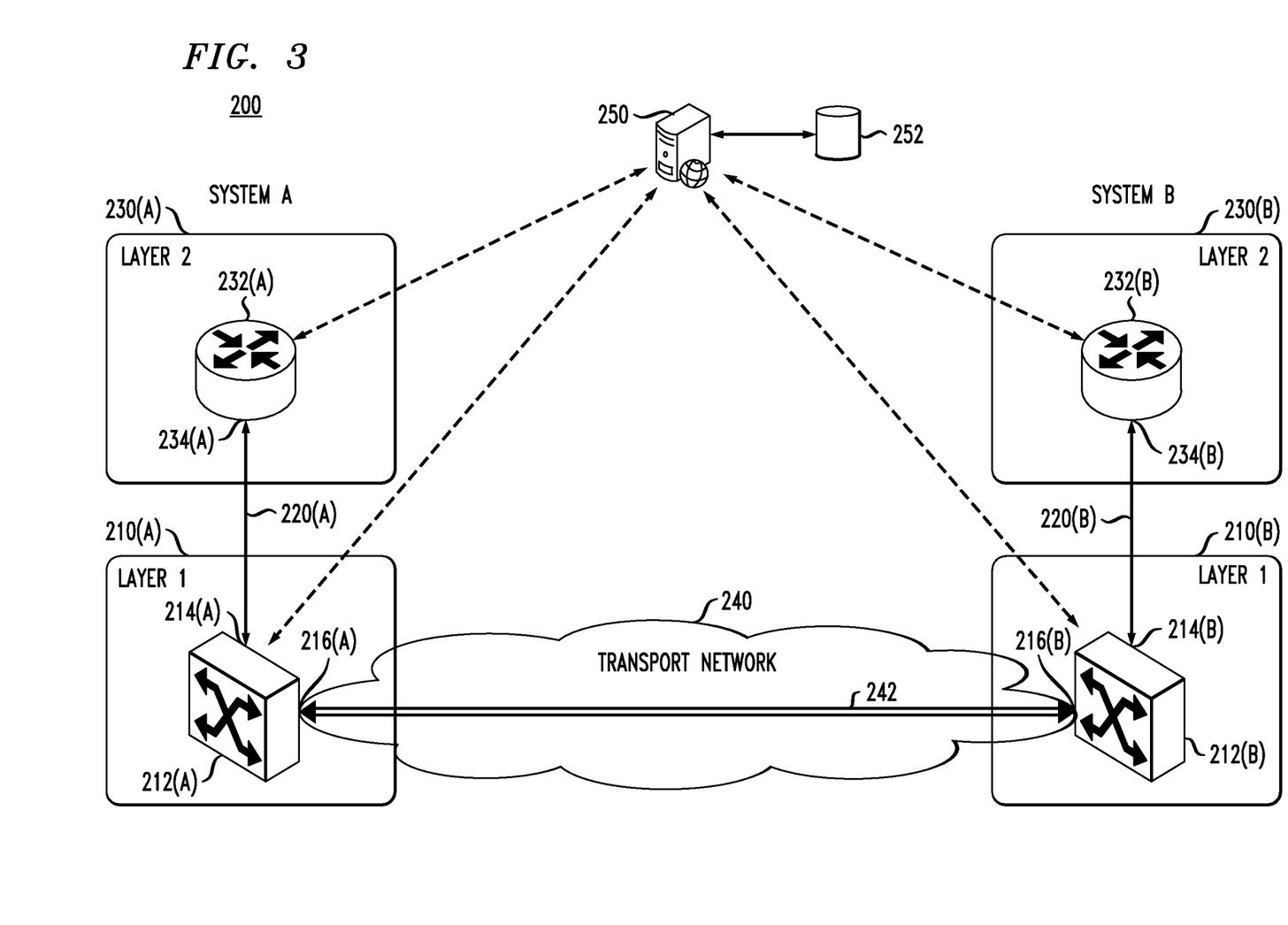
FIG. 3 is a simplified block diagram showing the physical connections for only one of the circuits in the comm network of FIG. 2.

FIG. 3 is a simplified block diagram showing the physical connections for only one of the circuits in the comm network 200 of FIG. 2, from a particular L2 component 232(A) in System A to a particular L2 component 232(B) in System B. In particular, for that one circuit:

Optical or electrical port 234(A) of L2 component 232(A) of System A is connected to optical or electrical port 214(A) of L1 component 212(A) of System A via a particular optical or electrical connection 220(A);

Optical or electrical port 214(A) of L1 component 212(A) is internally connected to optical port 216(A) of L1 component 212(A);

Optical port 216(A) of L1 component 212(A) is connected to optical port 216(B) of L1 component 212(B) of System B via a particular optical fiber 242 of the optical transport network 240;

Optical port 216(B) of L1 component 212(B) is internally connected to optical or electrical port 214(B) of L1 component 212(B); and Optical or electrical port 214(B) of L1 component 212(B) is connected to optical or electrical port 234(B) of L2 component 232(B) of System B via a particular optical or electrical connection 220(B).

In one possible implementation of the circuit inventory database, the end-to-end mapping for the circuit of FIG. 3 may be represented as a row of a table containing the following information:

L2 component 232(A) of System A;
(Optical or electrical) port 234(A) (of L2 component 232(A) of System A);
(Optical or electrical) port 214(A) (of L1 component 212(A) of System A);
L1 component 212(A) of System A;
(Optical) port 216(A) (of L1 component 212(A) of System A);
(Optical) port 216(B) (of L1 component 212(B) of System B);
L1 component 212(B) of System B;
(Optical or electrical) port 214(B) (of L1 component 212(B) of System B);
(Optical or electrical) port 234(B) (of L2 component 232(B) of System B); and
L2 component 232(B) of System B.

Figure 4:
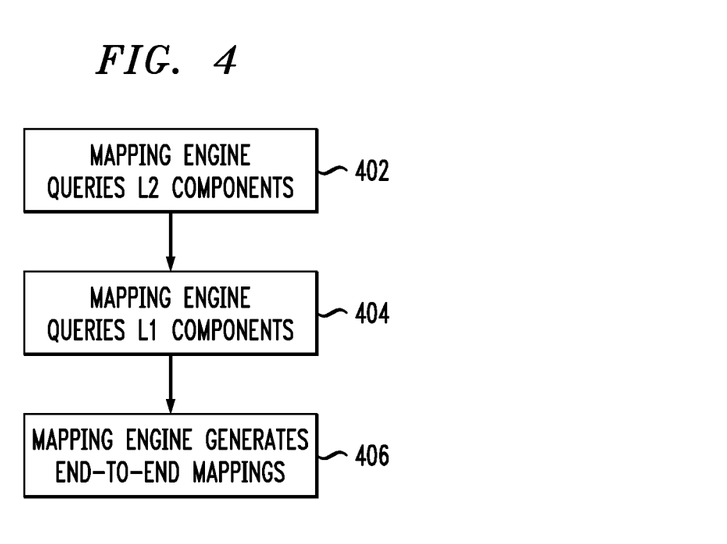
FIG. 4 is a flow diagram of the processing performed by the mapping engine of FIGS. 2 and 3, according to one possible implementation of the disclosure.

FIG. 4 is a flow diagram of the processing performed by the mapping engine 250 to generate the end-to-end mappings for the circuits currently provisioned in the comm network 200 of FIGS. 2 and 3, according to one possible implementation of the disclosure.

In Step 402, the mapping engine 250 queries the L2 components 232 listed in the device inventory database for their LLDP results. Regarding the circuit of FIG. 3, during Step 402, the mapping engine 250 learns that the port 234(A) of L2 component 232(A) of System A is logically connected to the port 234(B) of L2 component 232(B) of System B.

In Step 404, the mapping engine 250 queries the L1 components 212 listed in the device inventory database (i) for their LLDP snooping results and (ii) for their internal connections. Regarding the circuit of FIG. 3, during Step 404, the mapping engine 250 learns that:

The port 214(A) of L1 component 212(A) of System A is connected to both (i) the port 216(A) of L1 component 212(A) and (ii) the port 234(A) of L2 component 232(A) of System A; and The port 214(B) of L1 component 212(B) of System B is connected to both (i) the port 216(B) of L1 component 212(B) and (ii) the port 234(B) of L2 component 232(B) of System B.

With this information, the mapping engine 250 is able to determine that the two partial circuits are interconnected, thereby determining all of the port connections for the end-to-end mapping of the circuit of FIG. 3, and likewise for all of the circuits in the network 200.

In Step 406, the mapping engine 250 updates the circuit inventory database based on the determined end-to-end mappings. In some implementations, the mapping engine 250 generates a new version of the circuit inventory database with each implementation of the processing of FIG. 4.

Although the disclosure has been described in the context of the comm network 200 of FIGS. 2 and 3, which has (i) L1 components electrically connected to L2 components within each of Systems A and B and (ii) L1 components of System A optically connected to L1 components of System B, the disclosure is not so limited. In general, L1 components may be physically connected to L2 components in the same system by electrical, optical, and/or wireless connections;

L1 components may be physically connected to L1 components of different systems by electrical, optical, and/or wireless connections; and/or A comm network may have more than two systems, pairs of which may be interconnected in analogous manner as Systems A and B.

Furthermore, although comm network 200 of FIGS. 2 and 3 has L2 components that perform LLDP processing, those skilled in the art will understand that, in some implementations, individual components may perform the functions of both Layer 2 and Layer 3. In those implementations, it may be said that (i) the LLDP processing is performed at Layer 2, at Layer 3, or at both Layer 2 and Layer 3 and that (ii) the LLDP snooping is performed to identify the port-to-port connections between Layer 1 and Layer 2, between Layer 1 and Layer 3, or between Layer 1 and both Layer 2 and Layer 3. As used in the claims, the terms "Layer 2" and "L2" are understood to refer to Layer 2 components, to Layer 3 components, or to both Layer 2 and Layer 3 components.

Although embodiments have been described in the context of L2 components that perform LLDP processing and L1 components that perform LLDP snooping, in other implementations, L2 and L1 components may perform other suitable types of processing to determine their respective logical and physical connections.

In certain embodiments, the present disclosure is a mapping engine for a communication (comm) network comprising a plurality of interconnected comm systems, each comm system having one or more Layer 1 (L1) components physically connected to one or more Layer 2 (L2) components, wherein at least one L1 component is physically connected to an L1 component of a different comm system, the mapping engine comprising a hardware processor and a memory, wherein the processor is configured to determine any physical connections between the L1 and L2 components of each comm system; determine any physical connections within each L1 component; determine any logical connections between the L2 components of different comm systems; and generate end-to-end mappings for circuits between the L2 components of the different comm systems.

In at least some of the above embodiments, the processor is configured to query the L1 components for any physical connections and query the L2 components for any logical connections.

In at least some of the above embodiments, the processor is configured to represent the end-to-end mappings in a circuit inventory database stored in the memory.

In at least some of the above embodiments, the logical connections between the L2 components of the different comm systems are determined using a link-layer discovery process (LLDP); the physical connections between the L1 and L2 components of each comm system are determined using LLDP snooping; and the processor is configured to query the L2 components for LLDP results and the L1 components for LLDP snooping results.

Also for purposes of this disclosure, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding terminals, nodes, ports, links, interfaces, or paths may be referred to by the same name and are interchangeable for purposes here.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A mapping engine for a communication (comm) network comprising a plurality of interconnected comm systems, each comm system having one or more Layer 1 (L1) components physically connected to one or more Layer 2 (L2) components, wherein at least one L1 component is physically connected to an L1 component of a different comm system, the mapping engine comprising a hardware processor and a memory, wherein the processor is configured to:
   determine any physical connections between the L1 and L2 components of each comm system;
   determine any physical connections within each L1 component;
   determine any logical connections between the L2 components of different comm systems; and
   generate end-to-end mappings for circuits between the L2 components of the different comm systems.

2. The mapping engine of claim 1, wherein the processor is configured to:
   query the L1 components for any physical connections; and
   query the L2 components for any logical connections.

3. The mapping engine of claim 1, wherein the processor is configured to represent the end-to-end mappings in a circuit inventory database stored in the memory.

4. The mapping engine of claim 1, wherein:
   the logical connections between the L2 components of the different comm systems are determined using a link-layer discovery process (LLDP);
   the physical connections between the L1 and L2 components of each comm system are determined using LLDP snooping; and
   the processor is configured to query the L2 components for LLDP results and the L1 components for LLDP snooping results.

5. A hardware processor-implemented method for a comm network comprising a plurality of interconnected comm systems, each comm system having one or more L1 components physically connected to one or more L2 components, the method comprising a hardware processor:
   determining any physical connections between the L1 and L2 components of each comm system;
   determining any physical connections within each L1 component;
   determining any logical connections between the L2 components of different comm systems; and
   generating end-to-end mappings for circuits between the L2 components of the different comm systems.

6. The method of claim 5, wherein the processor:
   queries the L1 components for any physical connections; and
   queries the L2 components for any logical connections.

7. The method of claim 5, wherein the processor represents the end-to-end mappings in a circuit inventory database stored in the memory.

8. The method of claim 5, wherein:
the logical connections between the L2 components of the different comm systems are determined using a link-layer discovery process (LLDP);
the physical connections between the L1 and L2 components of each comm system are determined using LLDP snooping; and
the processor queries the L2 components for LLDP results and the L1 components for LLDP snooping results.

* * * * *

UNITED STATES PATENT AND TRADEMARK OFFICE
CERTIFICATE OF CORRECTION

| | |
|---|---|
| PATENT NO. | : 11,140,122 B1 |
| APPLICATION NO. | : 17/152197 |
| DATED | : October 5, 2021 |
| INVENTOR(S) | : Thomas Dudley and Ognian Mitev |

It is certified that error appears in the above-identified patent and that said Letters Patent is hereby corrected as shown below:

On the Title Page

Column 2, item (57), Line 5, In the Abstract, replace "wherein components are physically connected to L1 components of different comm systems." with --wherein L1 components are physically connected to L1 components of different comm systems.--

Signed and Sealed this
Twentieth Day of December, 2022

*Katherine Kelly Vidal*

Katherine Kelly Vidal
*Director of the United States Patent and Trademark Office*